US008392927B2

(12) United States Patent
Rolia et al.

(10) Patent No.: US 8,392,927 B2
(45) Date of Patent: Mar. 5, 2013

(54) SYSTEM AND METHOD FOR DETERMINING A PARTITION OF A CONSUMER'S RESOURCE ACCESS DEMANDS BETWEEN A PLURALITY OF DIFFERENT CLASSES OF SERVICE

(75) Inventors: Jerome Rolia, Ontario (CA); Ludmila Cherkasova, Sunnyvale, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1921 days.

(21) Appl. No.: 11/134,681

(22) Filed: May 19, 2005

(65) Prior Publication Data
US 2006/0265470 A1    Nov. 23, 2006

(51) Int. Cl.
*G06F 9/46* (2006.01)
(52) U.S. Cl. .................................................. 718/104
(58) Field of Classification Search .................. 718/104
See application file for complete search history.

(56) References Cited

U.S. PATENT DOCUMENTS

| | | | | |
|---|---|---|---|---|
| 4,864,628 A * | 9/1989 | Scott | ................................ | 382/197 |
| 5,408,663 A | 4/1995 | Miller | | |
| 5,598,532 A | 1/1997 | Liron | | |
| 5,826,082 A * | 10/1998 | Bishop et al. | ................. | 718/104 |
| 5,845,116 A * | 12/1998 | Saito et al. | ................... | 718/103 |
| 6,067,412 A * | 5/2000 | Blake et al. | ................... | 718/102 |
| 6,141,686 A | 10/2000 | Jackowski et al. | | |
| 6,272,544 B1 * | 8/2001 | Mullen | .......................... | 709/226 |
| 6,487,578 B2 * | 11/2002 | Ranganathan | ................. | 718/104 |
| 6,633,942 B1 * | 10/2003 | Balasubramanian | ......... | 710/264 |
| 6,711,616 B1 * | 3/2004 | Stamm et al. | ................. | 709/226 |
| 6,721,796 B1 | 4/2004 | Wong | | |
| 6,745,221 B1 | 6/2004 | Ronca | | |
| 6,952,427 B1 * | 10/2005 | Seguin et al. | ................. | 370/462 |
| 6,976,258 B1 * | 12/2005 | Goyal et al. | ................. | 718/104 |

OTHER PUBLICATIONS

Rolia, J. et al., "A Capacity Managemetn Serice for Resource Pools", HP Labs Technical Report, HPL-2005-01,2005, 15 pages.

* cited by examiner

*Primary Examiner* — Gregory Kessler (57) ABSTRACT

According to one embodiment, a method comprises receiving into a planning tool a representative workload for a consumer. The method further comprises determining, by the planning tool, an allocation of demand of the consumer for each of a plurality of different classes of service (COSs). According to one embodiment, a method comprises defining a plurality of classes of service (COSs) for use by a scheduler in allocating capacity of a resource pool to a consumer, wherein the COSs each specify a different priority for accessing the capacity of the resource pool. The method further comprises evaluating, by a planning tool, a representative workload of the consumer, and determining, by the planning tool, a partitioning of resource demands of the representative workload between the plurality of COSs.

27 Claims, 4 Drawing Sheets

SYSTEM AND METHOD FOR DETERMINING A PARTITION OF A CONSUMER'S RESOURCE ACCESS DEMANDS BETWEEN A PLURALITY OF DIFFERENT CLASSES OF SERVICE

FIELD OF THE INVENTION

The following description relates generally to managing access to resources, and more specifically to systems and methods for determining a partition of a consumer's resource access demands between a plurality of different classes of service.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a scheduler that monitors its workloads' demands and dynamically varies the allocation of capacity, e.g., CPU, to the workloads, thereby managing the utilization of the resources by the various consumers. For instance, the scheduler may dynamically vary allocation of the pool's capacity in a manner that attempts to provide each consumer with access only to the capacity it needs (for servicing its current workload). As a workload's demand increases, the scheduler may increase the amount of the resource pool's capacity that is allocated to such workload; and as a workload's demand decreases, the scheduler may decrease its allocation of the resource pool's capacity to such workload.

Difficulty arises in determining how much capacity of a resource pool to allocate to various consumers for supporting their respective workloads. From a consumer's point of view, having maximum capacity allocated to it may be desirable because that ensures that the consumer has the maximum capacity available from the resource pool for servicing its workload. From a resource pool manager's point of view, however, it is often desirable to limit the amount of capacity allocated to each consumer, as this allows more cost effective utilization of the pool's resources by enabling greater capacity that is available to be used by other consumers. Thus, a balance may be struck in which a certain amount of capacity is allocated to a consumer that is believed to be sufficient to satisfy the consumer's quality of service (QoS) goals, while permitting remaining capacity to be allocated to other consumers. The scheduler for a resource pool may be configured to manage the allocation of the resource pool's capacity to consumers in a manner that achieves such a balance in accordance with defined allocation parameters.

In implementing an allocation management strategy, a scheduler may be utilized that is capable of implementing different priorities or "classes of service" (COSs) for demands of a consumer's workload. For instance, a first COS may be defined having a high priority and a second COS may be defined having a lower priority, wherein all the demands associated with the first COS may be allocated capacity to be satisfied first and any remaining capacity is then used to satisfy the demands of the second, lower priority COS. For example, demands for up to X amount of CPU utilization by a given consumer may be classified as a first COS having high priority (e.g., to which the consumer is "guaranteed" access) and any amount of CPU utilization by such consumer beyond the X amount at any given time is classified as a second COS having lower priority (e.g., in which the consumer has a non-guaranteed probability, such as a 0.8 probability, of receiving the desired CPU resources above X amount), wherein CPU capacity of the resource pool may be allocated for servicing the lower priority demand if available (e.g., if not needed for satisfying other consumer's higher priority demands) and is expected to have approximately 0.8 probability of being available when needed for the consumer.

While schedulers can be employed to manage allocation of a resource pool's capacity according to a plurality of different COSs in this manner, it is often unclear how to partition a consumer's workload demands across the various COSs. That is, consumers and/or resource pool managers have traditionally lacked the planning tools for intelligently determining a proper partitioning (or "classification") of the workload's demands among different COSs to achieve a resource allocation that is suitable for the consumer and resource pool. For instance, assuming a first COS provides access probability of 1 (or "guaranteed" access) to resources and a second COS provides probability of 0.8 access to the resources for satisfying the demands associated with such second COS (as in the above example), difficulty exists in determining a proper breakpoint for dividing a consumer's resource demands between such first and second COSs (e.g., the amount X in the above example). Traditionally, the consumer has little understanding of how a given breakpoint for dividing its demand between different COSs will affect its quality of service and thus has little understanding of whether such breakpoint is suitable. Similarly, a resource pool manager has little understanding of a proper breakpoint to use in dividing a consumer's resource demands between different COSs for a given consumer that would be sufficient for satisfying the consumer's QoS goals while also allowing cost effective utilization of the pool's resources. Thus, a desire exists for a planning tool that aids in determining a suitable partitioning of a consumer's workload demands across various COSs.

DETAILED DESCRIPTION

Figure 1:
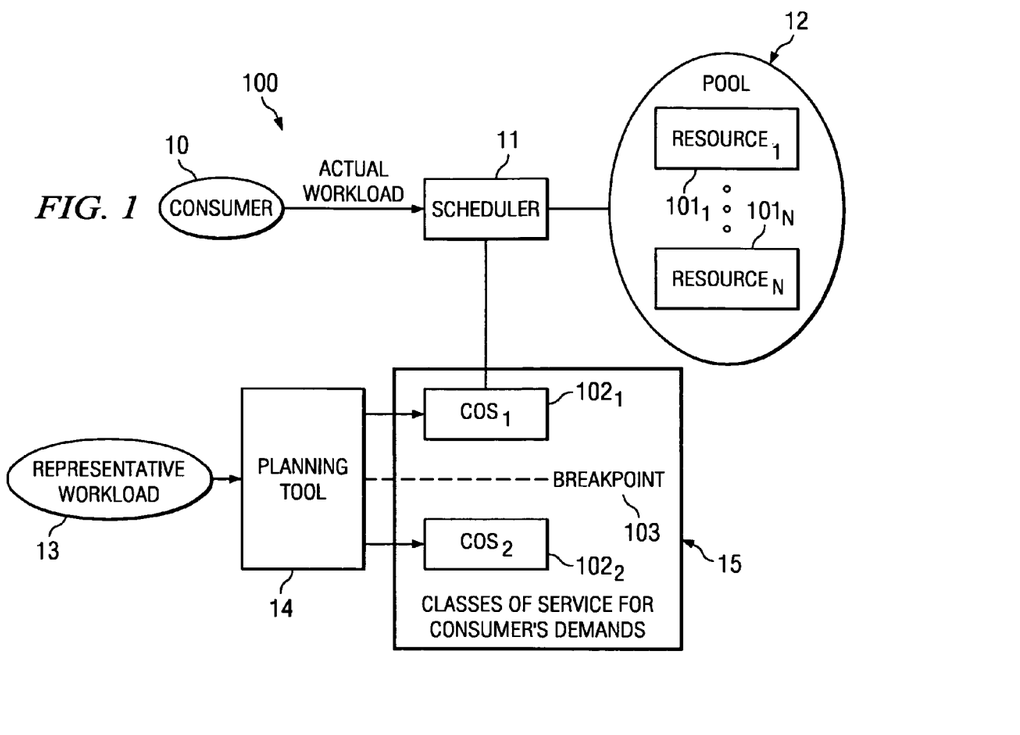
FIG. 1 shows an exemplary system employing one embodiment of the present invention.

FIG. 1 shows an exemplary system 100 employing one embodiment of the present invention. System 100 includes planning tool 14 that is operable to evaluate a consumer 10's workload 13 and determine a proper classification of the consumer 10's demands among a plurality of different COSs 15, such as $COS_1$ $102_1$ and $COS_2$ $102_2$ in the illustrated example. That is, planning tool 14 is operable to determine a breakpoint 103 for dividing resource demands of consumer 10 between $COS_1$ $102_1$ and $COS_2$ $102_2$. As described further below, in certain embodiments, planning tool 14 also receives resource access QoS objectives for resources in a resource pool and QoS desires of a consumer, and uses this information in analyzing the consumer's workload 13 to classify the consumer's demands among the COSs in a manner that will satisfy the resource access QoS objectives and consumer's QoS desires.

In certain embodiments, scheduler 11 provides guaranteed access to resources for servicing the demands classified as $COS_1$, and the scheduler 11 provides non-guaranteed access to resources for servicing the demands classified as $COS_2$. Of course, in other embodiments, the priorities of the COSs may be implemented in any desirable manner. For instance, none of the COSs may provide guaranteed access, but they may be prioritized such that one COS provides greater probability of access than another COS. While two COSs, $COS_1$ and $COS_2$, are shown in FIG. 1, it should be understood that application of the concepts presented herein for classifying a consumer's demands are not limited to classification among two COSs but may likewise be applied for classifying demands among any number of different COSs. For instance, in certain implementations 3 COSs may be employed in which scheduler 11 provides high priority (e.g., guaranteed) access to resources for the demands classified in the first COS, lower priority access for the demands classified in the second COS, and even lower priority access for the demands classified in the third COS. Thus, while one breakpoint 103 is shown as determined in the example of FIG. 1 for ease of discussion, the concepts presented herein may be readily employed for determining any number of such breakpoints for classifying a consumer's demands in any number of different COSs.

Workload 13 is a representative workload of consumer 10, which may be an actual historical workload collected for consumer 10 or a synthetic workload generated to represent the workload of consumer 10, as examples. In one embodiment, workload 13 includes data identifying various time periods and the corresponding demands for resource access (e.g., CPU utilization) desired by consumer 10. For instance, workload 13 may comprise a sequence of timestamps (which may be 5 seconds apart, 5 minutes apart, etc., depending on the appropriate time granularity for the environment/resource) and the corresponding resource utilization (e.g., CPU, I/O, network, or other resource utilization) for each timestamp.

Such workload 13 thus provides an estimation of the future workload expected for consumer 10. For instance, a historical workload of, say, 3 months of usage of consumer 10, may provide a good estimation of a future workload expected to be incurred by consumer 10. Accordingly, by evaluating workload 13 for classifying the demands of consumer 10 encountered in such workload among $COS_1$ $102_1$ and $COS_2$ $102_2$, planning tool 14 provides a good classification of such demands that can be used going forward for managing future workloads of consumer 10. The COSs 15 may then be used by scheduler 11 for managing access by consumer 10 to resources of a resource pool 12, such as resources $101_1, \ldots, 101_N$.

In certain embodiments, each resource in pool 12 may have a scheduler 11 associated therewith that monitors its workloads' demands and dynamically varies the allocation of capacity, e.g., CPU, to the workloads aiming to provide each with access only to the capacity it needs. As a workload's demand increases its allocation of resource capacity may increase, and as the workload's demand decreases its allocation of resource capacity may decrease. According to one embodiment, such schedulers may control the relationship between demand and allocation using a burst factor n, e.g., such that a workload's allocation will be approximately some real value n≧1 times its recent demand. In another embodiment, a scheduler may make use of several recent measurements to compute an allocation. Thus, while certain embodiments described further below make use of the notion of a burst factor, embodiments of the message-linking algorithm are not limited to determining allocations based on such burst factor may instead be implemented in a manner that is compatible with any of various other types of allocation algorithms.

The burst factor addresses the issue that allocations are adjusted using periodic utilization measurements. For instance, utilization measurements over an interval may be mean values that hide the bursts of demand within the interval. For instance, suppose an average demand over a time interval of 1 minute is determined by planning tool 14 from an analysis of workload 13; in this instance, such demand fails to indicate any bursts of demand that may have been encountered within the 1 minute interval, which may have greatly exceeded the average demand over the 1 minute interval. In general, the greater the workload variation and client population, the greater the potential for bursts in demand and the greater the need for a larger allocation relative to mean demand (i.e., utilization), and hence the need for a larger burst factor to ensure that sufficient resource capacity is allocated to the consumer to satisfy the bursts of demand. The product of mean demand and this burst factor estimates the true demand of the consumer at short time scales and is used for the purpose of allocation. Further, as mentioned above, scheduler 11 can implement at least two priorities with all the demands associated with the highest priority satisfied first. Any remaining capacity is then used to satisfy the demands of the next priority, and so on.

When hosting consumers (such as enterprise applications) in resource pool 12, the consumers often operate continuously and have unique time varying demands and performance oriented quality of service (QoS) objectives. The consumers can share individual resources, such as a CPU, or in some instances may demand many resources. An approach used in certain embodiments of the present invention for classifying the demands of the consumers is as follows. The resource pool operator decides on the resource access QoS objectives for two classes of service for resources in the resource pool. The first class of service is associated with the highest scheduling priority. The second is associated with the lower priority. Each consumer (e.g., application) owner specifies its consumer workload's QoS desire. This may be specified as a range for the burst factor, such as a range of values that correspond to ideal and simply adequate consumer QoS. Planning tool 14 receives this information and maps each consumer's workload demands onto the two classes of service. This mapping determines scheduling parameters for the workload.

In the above exemplary approach, the resource access QoS objectives specified by the resource pool operator govern the degree of overbooking in the resource pool 12. In one embodiment, the first COS offers guaranteed service. It corresponds to the scheduler 11's high priority service. A capacity manager (not shown in FIG. 1) may be implemented to ensure that the sum of the demands associated with this first COS does not exceed the capacity of the resources in the resource pool 12. The second COS offers a lower QoS. It manages overbooking, i.e., statistical multiplexing, for each resource. Techniques are described further herein that may be employed by planning tool 14 for determining a suitable partitioning of a consumer's workload demands across a plurality of different COSs to realize application level performance oriented QoS objectives.

Figure 2:
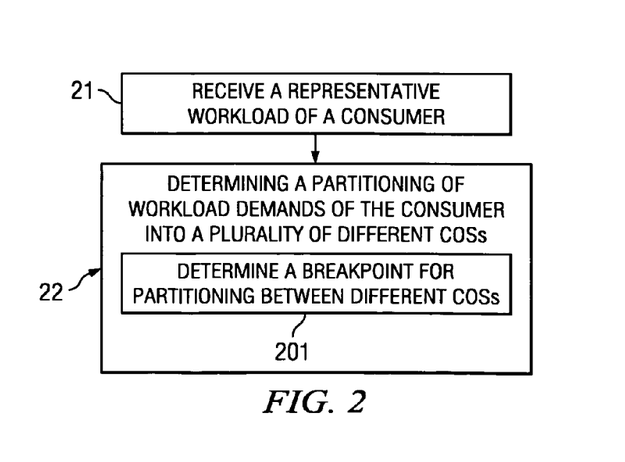
FIG. 2 shows an operational flow diagram of the planning tool of FIG. 1 according to one embodiment of the present invention.

FIG. 2 shows an operational flow diagram of planning tool 14 according to one embodiment of the present invention. In this embodiment, planning tool 14 receives, in operational block 21, a representative workload 13 of a consumer 10. In operational block 22, planning tool 14 determines a partitioning of workload demands of the consumer 10 into a plurality of different COSs, such as $COS_1$ and $COS_2$ of FIG. 1. As described further herein, in certain embodiments partitioning the workload demands in operational block 22 comprises determining a breakpoint, such as breakpoint 103 of FIG. 1, for partitioning between the different COSs, in operational block 201.

Figure 3:
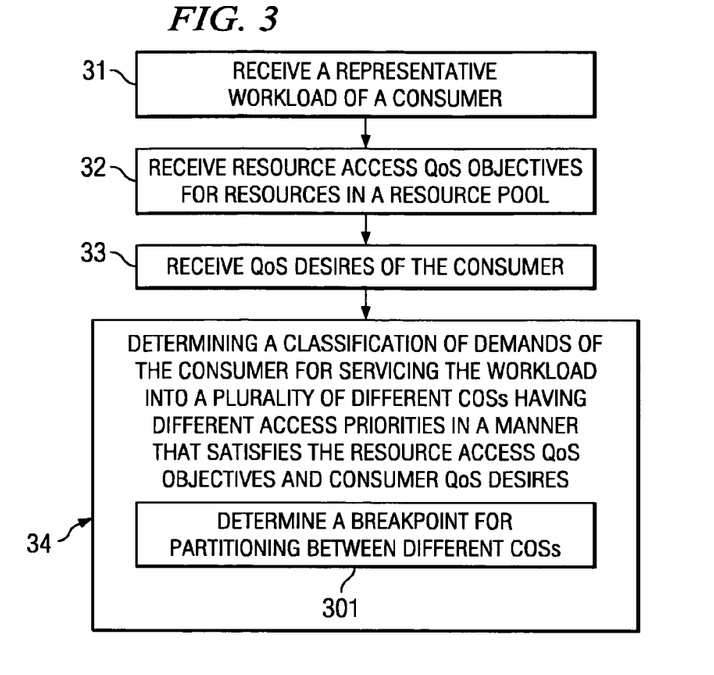
FIG. 3 shows a more detailed operational flow diagram of the planning tool according to one exemplary embodiment of the present invention.

In certain embodiments, the planning tool 14 provides a technique for mapping a consumer's (e.g., application's) workload demands across two (or more) classes of service to realize its application QoS objectives. FIG. 3 shows a more detailed operational flow diagram of planning tool 14 according to one exemplary embodiment of the present invention. In operational blocks 31-33, the planning tool 14 receives as input a characterization of a consumer's workload demands on the resource (block 31), the resource access QoS objectives for resources in the resource pool (block 32), and the application level QoS requirements (block 33) which may be expressed using a range for the burst factor. Application tool 14 determines in block 34 how the consumer's workload demands should be partitioned across the pool's plurality of different COSs (e.g., a guaranteed $COS_1$ and non-guaranteed $COS_2$). For instance, application tool 14 may determine in sub-block 301 a breakpoint for partitioning demands of the consumer between the different COSs. The inputs and outputs of certain embodiments are described further below.

In one embodiment, a trace-based approach is employed to model the sharing of resource capacity for resource pools. An example of such a trace-based approach is described in J. Rolia, L. Cherkasova, M. Arlitt, and A. Andrzejak, "A Capacity Management Service for Resource Pools," HP Labs Technical Report, HPL-2005-01, 2005, the disclosure of which is hereby incorporated herein by reference. For instance, each consumer workload (received as input in block 31 of FIG. 3) may be characterized using several weeks to several months of demand observations, e.g., with one observation every 5 minutes. The general idea behind trace-based methods is that traces capture past demands and that future demands will be similar. Though we expect demands to change, for most applications they are likely to change slowly, e.g., over several months. By working with recent history the planning tool can adapt to such change. That is, by periodically re-evaluating recent workload history of a consumer, the planning tool can adapt its classifications of the consumer's demand among the COSs. Significant changes in demands, due to changes in business processes or application functionality are best forecast by business units and communicated to the operators of the resource pool so that their impact, e.g., scale demands up or down, can be reflected in the trace.

In certain embodiments, a capacity manager is included, which provides a service that is used by the resource pool operator to assign workloads to specific resources and quickly assess the impact of future demands on the pool. An exemplary implementation of such a capacity manager is described further in J. Rolia, L. Cherkasova, M. Arlitt, and A. Andrzejak, "A Capacity Management Service for Resource Pools," HP Labs Technical Report, HPL-2005-01, 2005. In such an implementation, the capacity manager has an optimizing search method that supports consolidation (e.g., tight packing) and load leveling (e.g., load balancing) exercises. The capacity manager service uses the traces of demands to assign workloads to specific resources such that when traces are replayed, demands associated with the first COS are guaranteed and demands associated with the second COS are offered with an operator specified resource access probability θ.

A formal definition for such a resource access probability θ according to one embodiment is as follows (of course, other embodiments of the message-linking algorithm may be employed to make use of other definitions of θ). Let A be the number of workload traces under consideration. Each trace has W weeks of observations with T observations per day as measured every m minutes. Without loss of generality, we use the notion of a week as a timescale for service level agreements. Of course, the approach described herein can be readily adapted to any time scales, and is thus not limited to the exemplary timescales used for this illustrative description.

Time of day captures the diurnal nature of interactive enterprise workloads (i.e., those used directly by end users). Again, other time scales and patterns can also be used as may be desired. Each of the T times of day, e.g., 8:00 a.m. to 8:05 a.m., is referred to as a "slot." Accordingly, for 5 minute measurement intervals, there exists T=288 slots per day. Each slot may be denoted using an index $1 \leq t \leq T$.

Each day x of the seven days of the week has an observation for each slot t. Each observation has a measured value for each of the capacity attributes considered in the analysis. Without loss of generality, consider one class of service and one attribute that has a capacity limit of L units of demand. Let $D_{w,x,t}$ be the sum of the demands upon the attribute by the A workloads for week w, day x and slot t. The measured value for $\theta$ may be defined as follows:

$$\theta = \min_{w=1}^{W} \min_{t=1}^{T} \frac{\sum \min(D_{w,x,t}, L)}{\sum_{x=1}^{7} D_{w,x,t}}$$

Thus, $\theta$ can be reported as the minimum resource access probability received any week for any of the T slots per day. Furthermore, a COS constraint may be defined as the combination of a required value for $\theta$ and a deadline s such that those demands that are not satisfied are satisfied within the deadline. Let L' be the required capacity for an attribute to support a COS constraint. A required capacity L' is the smallest capacity value, $L' \leq L$, to offer a probability $\theta'$ such that $\theta' \geq \theta$ and those demands that are not satisfied upon request, $D_{w,x,t} - L' > 0$, are satisfied within the deadline. The deadline can be expressed, for instance, as an integer number of slots s.

The relationship between acceptable application QoS and system resource usage is complex. In certain embodiments of the present invention, an empirical approach is employed by planning tool 14 that aims to find an acceptable range for the burst factor that relates workload demand to a scheduled allocation for the CPU capacity attribute. Though access to CPU capacity is not the only issue that can affect application quality of service, it is often responsible and limits a workload's access to many other capacity attributes. Of course, the approach described herein may be employed for likewise scheduling allocation of other capacity attributes of a resource. In one embodiment, a stress testing exercise is used to submit a representative workload to the application in a controlled environment. Within the controlled environment, the planning tool 14 varies the burst factor that governs the relationship between application demand and allocation. Planning tool 14 searches for the value of burst factor $n_{ideal} \geq 1$ that gives the responsiveness required by application users (i.e., very good but not better than necessary), and the value $n_{ok}$: $1 \leq n_{ok} \leq n_{ideal}$ that offers adequate responsiveness (i.e., worse responsiveness would not be acceptable to the application users). These define an acceptable range of operation for the application (or "consumer") on the resource.

These values for n bound lower and upper values for the utilization of an allocation:

$$U_{low} = \frac{1}{n_{ideal}}$$

and $$U_{high} = \frac{1}{n_{ok}}$$

Thus, in this exemplary embodiment the utilization of the allocation must remain in the range ($U_{low}$, $U_{high}$), where $U_{high}$ is acceptable but not ideal.

According to this exemplary embodiment, planning tool 14 is operable to partition a consumer's (e.g., an application's) workload demands across two classes of service, namely $COS_1$ and $COS_2$, to ensure that the consumer's burst factor remains within its acceptable range ($U_{low}$, $U_{high}$). In this example, $COS_1$ offers guaranteed access to capacity. By associating part of the demands with $COS_1$, the resource access risk is limited to the demands associated with $COS_2$. $COS_2$ has a resource access probability of $\theta$ and a deadline s as may be chosen by a user (e.g., the resource pool operator or owner of the consuming application, etc.). That is, the resource access probability of $\theta$ for $COS_2$ and deadline s may be input to planning tool 14 (e.g., as resource access QoS objectives received in block 32 of FIG. 3). The QoS desires of the consumer that is input to the planning tool in block 33 of FIG. 3 may, for example, provide an indication of $n_{ok}$ and $n_{ideal}$ that is used by the planning tool for determining the range ($U_{low}$, $U_{high}$). Additionally, in certain embodiments, benchmarking of the applications may be performed for a desired response time in order to determine the $n_{ok}$ and $n_{ideal}$ values to be utilized by the planning tool.

Consider three operating scenarios for a resource: i) it has sufficient capacity to meet its current demands, ii) demand exceeds supply but the resource is satisfying its resource access constraint, and iii) demand exceeds supply and the resource is not satisfying its resource access constraint. Planning tool 14 determines an appropriate classification of the consumer's demands between COS1 and COS2 to manage resource access in the first two operating scenarios. Capacity management services may be employed to avoid the third scenario, such as the capacity management services described in J. Rolia, L. Cherkasova, M. Arlitt, and A. Andrzejak, "A Capacity Management Service for Resource Pools," HP Labs Technical Report, HPL-2005-01, 2005.

When the system has sufficient capacity, each consumer's workload gets access to all the capacity it needs. In this case, the consumer's resource needs will all be satisfied and the consumer's utilization of allocation will be $U_{ideal}$. In the case where demands exceed supply, the demands associated with $COS_1$ are all guaranteed to be satisfied. However, the demands associated with $COS_2$ are not guaranteed and will be offered with a resource access probability no worse than $\theta$. In this embodiment, planning tool 14 aims to divide workload demands across these two COSs while ensuring that the utilization of allocation remains in the range ($U_{ideal}$, $U_{ok}$) to satisfy the consumer's QoS requirements.

Continuing with this example, let p be a fraction of peak demand D for the CPU attribute for the consumer's workload that is associated with $COS_1$. The value p×D gives a breakpoint for the consumer's workload such that all demand less than or equal to this value is placed in $COS_1$ and the remaining demand is placed in $COS_2$. This breakpoint value is the scheduling parameter that planning tool 14 computes in this embodiment.

Planning tool 14 solves for p such that in the second scenario (demand exceeds supply but the resource is satisfying its resource access constraint) the consumer workload's burst factor is no worse than $n_{ok}$. The range of allocations are selected to be between $A_{ideal}=D \times n_{ideal}$ and $A_{OK}=D \times n_{OK}$. So, the allocation for the lower but acceptable QoS offered to the consumer is:

$$A_{ok}=A_{ideal} \times p + A_{ideal} \times (1-p) \times \theta.$$

Solving this equation for p, provides:

$$p = \frac{\frac{n_{ok}}{n_{ideal}} - \theta}{1 - \theta}$$

where $1 \geq \theta > 0$.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 4:
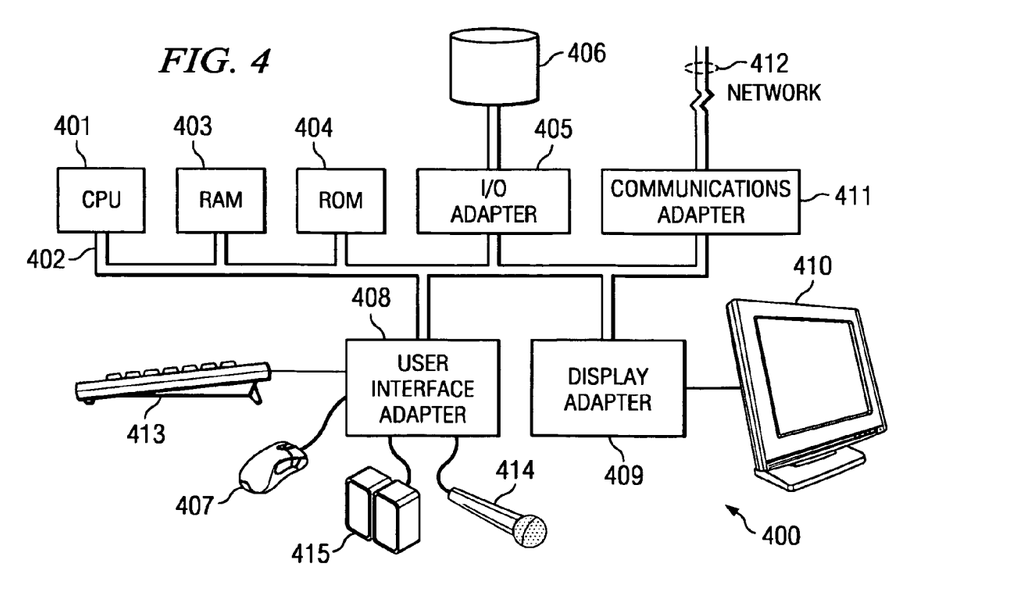
FIG. 4 shows an exemplary system on which the planning tool may be implemented according to one embodiment of the present invention.

FIG. 4 illustrates an exemplary computer system 400 on which the planning tool 14 may be implemented according to one embodiment of the present invention. Central processing unit (CPU) 401 is coupled to system bus 402. CPU 401 may be any general purpose CPU. The present invention is not restricted by the architecture of CPU 401 (or other components of exemplary system 400) as long as CPU 401 (and other components of system 400) supports the inventive operations as described herein. CPU 401 may execute the various logical instructions according to embodiments of the present invention. For example, CPU 401 may execute machine-level instructions according to the exemplary operational flows described above in conjunction with FIGS. 2 and 3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as resource access QoS objectives and/or QoS desires of a consumer.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for operations of the planning tool (e.g., representative workload, resource access QoS objectives, consumer QoS desires, $n_{ok}$ and $n_{ideal}$ values, other variable values used in determining a breakpoint between different COSs). Communications adapter 411 is preferably adapted to couple computer system 400 to network 412, which may enable information to be input to and/or output from system 400 via such network 412 (e.g., the Internet or other wide-area network, a local-area network, a public or private switched telephony network, a wireless network, any combination of the foregoing). For instance, a representative workload for a consumer may be input to system 400 via network 412 from a remote computer, and a computed classification (e.g., breakpoint) of the consumer's demands between different COSs may be output and communicated via network 412 to a remote computer (e.g., to a remote scheduler for use in managing the consumer's access to resources). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display information regarding the determined partitioning (or classification) of a consumer's demands between different COSs according to certain embodiments of the present invention.

It shall be appreciated that the present invention is not limited to the architecture of system 400. For example, any suitable processor-based device may be utilized for implementing planning tool 14, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Figure 5A:
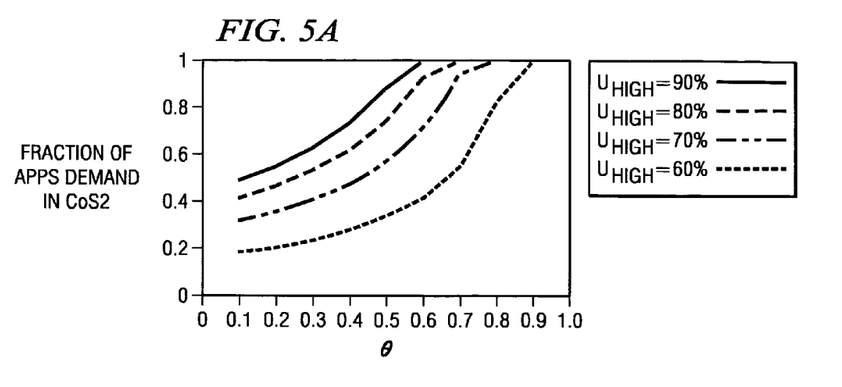
FIGS. 5A-5B show graphs illustrating the general results of a case study conducted for one embodiment.
Figure 5B:
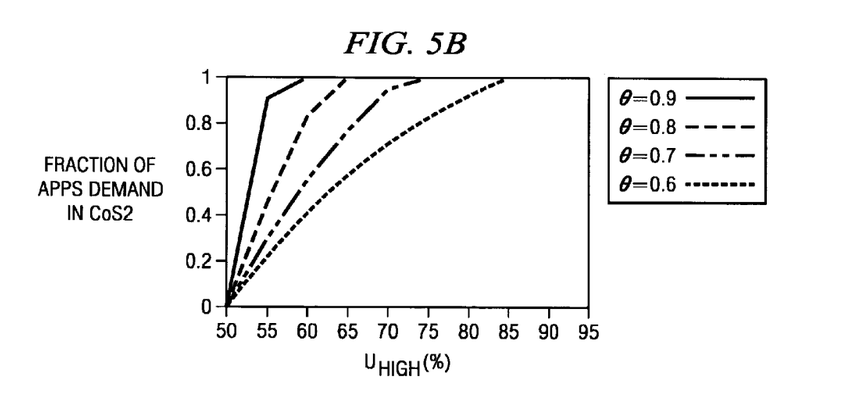
Figure 6:
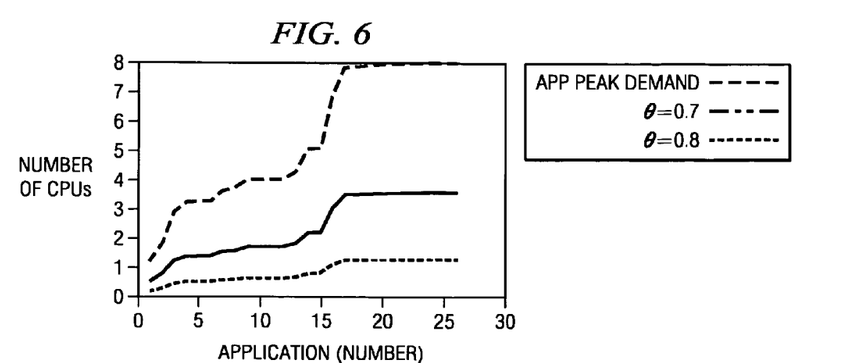
FIG. 6 shows the impact of one exemplary embodiment of the planning tool on the 26 applications of a large enterprise order entry system in the case study.
Figure 7A:
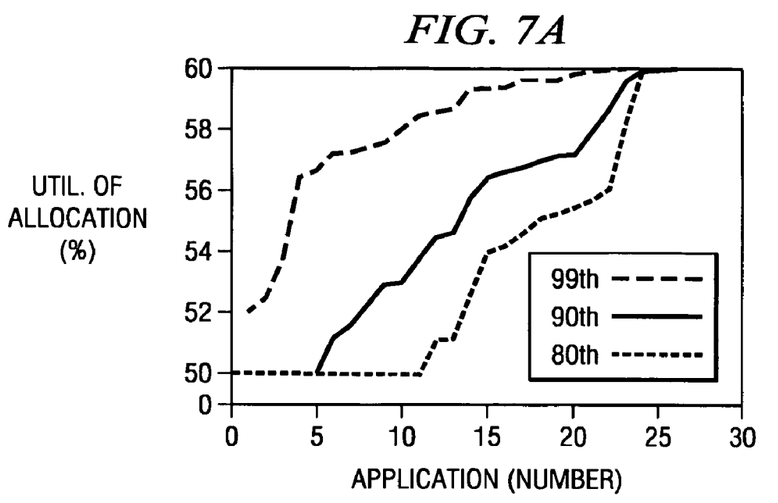
FIGS. 7A-7B show the distribution of utilization of allocation for each application in the case study for the θ=0.7 and θ=0.8 scenarios, respectively.
Figure 7B:
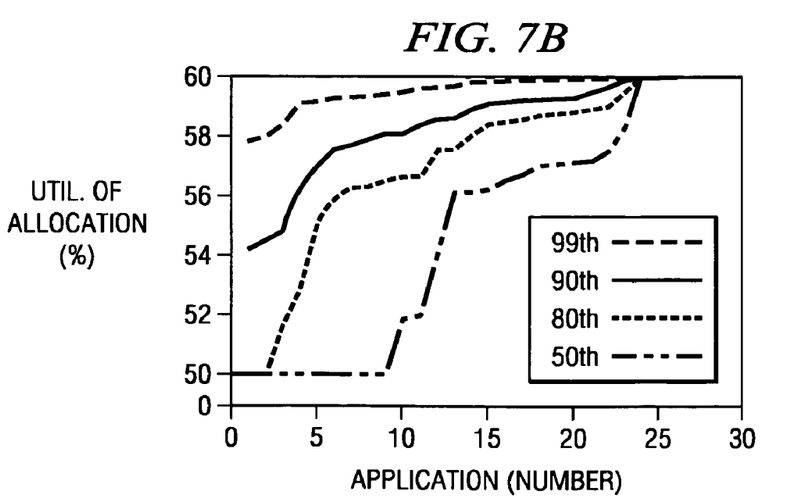

General results obtained in a case study conducted for one embodiment of the planning tool 14 and the implications of the results on 26 application workloads from a large enterprise order entry system are now briefly described for illustrative purposes in connection with FIGS. 5-7. This case study and its results are described merely as an example that illustrates the effectiveness of one embodiment of planning tool 14 for partitioning a consumer's demands between different COSs. Of course, the exemplary case study and the results obtained therein are not intended to limit the scope of the present invention in any way, but are instead intended solely as an illustrative example.

In this exemplary case study, planning tool 14 determines an appropriate partitioning of a consumer's resource demands between two COSs, $COS_1$ and $COS_2$, wherein $COS_1$ provides guaranteed access to resources and $COS_2$ provides non-guaranteed resource access. FIGS. 5A-5B present the general results of the case study. FIG. 5A shows the general relationship between resource access probability $\theta$ for $COS_2$, the burst factor range that describes a consumer's QoS requirement (expressed as a range of utilization of allocation), and the fraction of a consumer's peak demand that gets associated with $COS_2$. Four curves are shown. These correspond to a utilization of allocation range of (0.5, 0.6) which is a high QoS through to (0.5, 0.9) which is a comparatively low QoS. FIG. 5A shows that even a low resource access probability of $\theta=0.55$ permits between 30% and 100% of consumer demands to be associated with $COS_2$. FIG. 5B presents similar results in a manner that allows a capacity manager to automatically map between a consumer's acceptable utilization range, the operator selected value for $\theta$, and the percentage value p needed to find the breakpoint used to divide the consumer's workload across the two COSs.

FIG. 6 illustrates the impact of this exemplary approach on the 26 applications (consumers) of the large enterprise order entry system. In this scenario, the application utilization of allocation is in the range (0.5, 0.6). FIG. 6 shows the peak number of CPUs needed by each application, and for $\theta=0.8$ and θ=0.7, how many CPUs must be provisioned using the guaranteed $COS_1$ (as determined by the corresponding breakpoint). As expected, a higher value for θ means a lower breakpoint so that less demand is associated with $COS_1$ and more with $COS_2$. The higher value for θ means a lower breakpoint so that less demand is associated with $COS_1$ and more with $COS_2$. The higher value for θ increases the use of the shared portion of each resource, which may increase the utilization of resources in the pool. However, there are diminishing returns. A value of θ=0.9 puts virtually all application workload demands in $COS_2$.

FIGS. 7A-7B provide insight into how the selected breakpoint affects each of the applications in this exemplary case study. By choosing a breakpoint based on an application's peak CPU demand, this technique provisions for the scenario where the application requires its peak demand. FIGS. 7A-7B illustrate the distribution of utilization of allocation for each application for the θ=0.7 and θ=0.8 scenarios, respectively. FIG. 7A shows that 11 of 26 applications spend 80% of their time at 50% utilization of their allocation, i.e., $U_{low}$. For much of the time the application's demands are less than the breakpoint so all of its demands are satisfied by $COS_1$. These 11 applications spend 99% of their time below the 59% utilization of allocation. FIG. 7B has θ=0.8, which introduces greater opportunity for sharing. In this scenario only 2 of 26 applications spend 80% of their time at 50% utilization of their allocation. It is interesting to note that increasing the resource access probability for $COS_2$ in this case study puts more application demands in $COS_2$ and therefore puts the application at greater risk of operating closer to the higher end of its utilization of allocation, $U_{high}$.

Again, the concepts presented herein are not limited to the exemplary embodiments described above. For instance, embodiments of the present invention are not limited to partitioning between two COSs, but may likewise be applied for partitioning workload demands of a consumer among any number of COSs.

What is claimed is:

1. A method executed by a computer comprising:
   receiving, into a planning tool executed by the computer, a consumer quality of service (QoS) desire for a consumer and a historical workload for the consumer;
   determining, by said planning tool and based on the QoS desire and the historical workload, an allocation of demand of said consumer for each of a plurality of different classes of service (COSs), wherein said plurality of different COSs comprises a first COS having one priority for resource access for servicing demand allocated to said first COS and a second COS having an other priority for resource access for servicing demand allocated to said second COS; and
   determining, by said planning tool, a breakpoint between said COSs, said breakpoint dividing the COSs into one COS with the one priority for accessing a resource and a second COS with the other priority for accessing the resource, wherein said one priority comprises guaranteed resource access, and wherein the other priority comprises non-guaranteed resource access.

2. The method of claim 1 further comprising, outputting said determined allocation, wherein said outputting comprises at least one selected from the group consisting of:
   presenting to a display, outputting to data storage, and communicating to an application.

3. The method of claim 2 wherein said application comprises a resource management application.

4. The method of claim 1 wherein said second COS has a resource access probability of no worse than θ.

5. The method of claim 4 further comprising:
   receiving, by said planning tool, input specifying a value of said θ.

6. The method of claim 4 further comprising:
   determining a value of said θ as $$\theta = \min_{w=1}^{W} \min_{t=1}^{T} \frac{\sum \min(D_{w,x,t}, L)}{\sum_{x=1}^{7} D_{w,x,t}},$$

where said historical workload comprises a number of traces and each trace has W weeks of observations with T observations per day as measured every m minutes, each t time of day is a slot such that $1 \leq t \leq T$, each day x of a week has an observation for each slot t, a resource attribute has a capacity limit of L units of demand, and $D_{w,x,t}$ is the sum of the demands upon the resource attribute by the historical workload for week w, day x and slot t.

7. The method of claim 1 further comprising:
   determining a consumer demand for the consumer, the consumer demand based on a burst factor and an average demand over a time period.

8. The method of claim 1 wherein said consumer QoS desire expressed as a range for a burst factor.

9. The method of claim 8 further comprising:
   said planning tool determining a value of burst factor $n_{ideal} \geq 1$ that gives the responsiveness desired by said consumer.

10. The method of claim 9 further comprising:
    said planning tool determining a value of burst factor $n_{ok}$ that offers adequate responsiveness, where $1 \leq n_{ok} \leq n_{ideal}$.

11. The method of claim 10 further comprising:
    said planning tool computing $U_{low} = 1/n_{ideal}$ and $U_{high} = 1/n_{ok}$, where an acceptable range of said consumer's burst factor is determined as $(U_{low}, U_{high})$.

12. The method of claim 11 further comprising;
    said planning tool partitioning demands of the consumer across the plurality of COSs in a manner that ensures that the consumer's burst factor remains within its acceptable range $(U_{low}, U_{high})$.

13. The method of claim 12 further comprising:
    the planning tool determining a value p that is a fraction of peak demand D in a consumer's workload for a resource that is associated with a first of said plurality of COSs, where $$p = \frac{\frac{n_{ok}}{n_{ideal}} - \theta}{1 - \theta}.$$

14. The method of claim 13 further comprising:
    the planning tool determining a value of p×D as a breakpoint for the consumer's workload, wherein all demand less than or equal to p×D is assigned to a first of said plurality of COSs and the remaining demand is assigned to another of said plurality of COSs.

15. The method of claim 1 further comprising:
    receiving, by said planning tool, resource access quality of service (QoS) objectives for resources.

16. A non-transitory, computer-readable medium storing instructions that are executed by a computer to perform a method, comprising:

receiving a workload for a consumer;
receiving information about resource access quality of service (QoS) objectives;
receiving information about said consumer's desired QoS;
determining a breakpoint for partitioning resource demands of said workload between a plurality of different classes of service (COSs) in compliance with said resource access QoS objectives and said consumer's desired QoS wherein the breakpoint separates the plurality of different COSs to have different probabilities of access to a resource;
wherein said plurality of different COSs comprise a first COS having a first priority for guaranteed resource access for servicing demand allocated to said first COS and a second COS having a second priority for non-guaranteed resource access for servicing demand allocated to said second COS.

17. The computer-readable medium of claim 16 wherein said second COS has a resource access probability of no worse than $\theta$.

18. The computer-readable medium of claim 17 further comprising:
receiving input specifying a value of said $\theta$.

19. The computer-readable medium of claim 16 further comprising:
determining a value $n_{ideal} \geq 1$ of a burst factor that gives responsiveness desired by said consumer; and
determining a value $n_{ok}$ of said burst factor that offers adequate responsiveness, where $1 \leq n_{ok} \leq n_{ideal}$.

20. The computer-readable medium of claim 19 wherein said determining $n_{ideal}$ and said determining $n_{ok}$ comprise:
receiving said values of $n_{ideal}$ and $n_{ok}$.

21. The computer-readable medium of claim 20 further comprising:
computing $U_{low}=1/n_{ideal}$ and $U_{high}=1/n_{ok}$, where an acceptable range of said burst factor for said consumer is determined as $(U_{low}, U_{high})$.

22. The computer-readable medium of claim 21 wherein said determining said breakpoint comprises:
determining said breakpoint for partitioning resource demands of said workload between the plurality of different COSs in a manner that ensures that the consumer's burst factor remains within its acceptable range $(U_{low}, U_{high})$.

23. A method executed by a computer, comprising:
receiving, by the computer, a synthetic workload generated to represent a workload of a consumer;
analyzing, by the computer, the synthetic workload to determine an allocation of resource demands among a plurality of different classes of service (COSs); and
allocating, by the computer, capacity of a resource pool to said consumer based at least in part on said COSs;
wherein said plurality of different COSs comprise a first COS having a first priority for guaranteed resource access for servicing demand allocated to said first COS and a second COS having a second priority for non-guaranteed resource access for servicing demand allocated to said second COS.

24. The method of claim 23 wherein said second COS has a resource access probability of no worse than $\theta$.

25. The method of claim 23, further comprising:
dividing the plurality of different COSs at a breakpoint, the breakpoint providing a customer associated with a first COS with a first probability of accessing a processing resource and providing a customer associated with a second COS with a second probability of accessing the processing resource.

26. A computer, comprising:
a memory storing executable instructions; and
a processor that executes the instructions for:
defining a plurality of classes of service (COSs) for use by a scheduler in allocating capacity of a resource pool to a consumer, wherein the COSs each specify a different priority for accessing said capacity of said resource pool;
evaluating, by a planning tool, a historical workload of said consumer and receiving a desired quality of service (QoS) for the consumer; and
determining, by said planning tool and based on the historical workload and the QoS, a breakpoint for partitioning of resource demands between said plurality of COSs;
wherein said plurality of COSs comprise a first COS having a first priority providing guaranteed resource access and a second COS having a second priority providing non-guaranteed resource access.

27. The computer of claim 26 further comprising:
using said determined partitioning by said scheduler for allocating capacity of said resource pool to said consumer in servicing the consumer's workload.

* * * * *